Jan. 6, 1959   D. R. DENAULT ET AL   2,867,771
ELECTRICAL TESTING FIXTURE
Filed Nov. 12, 1954
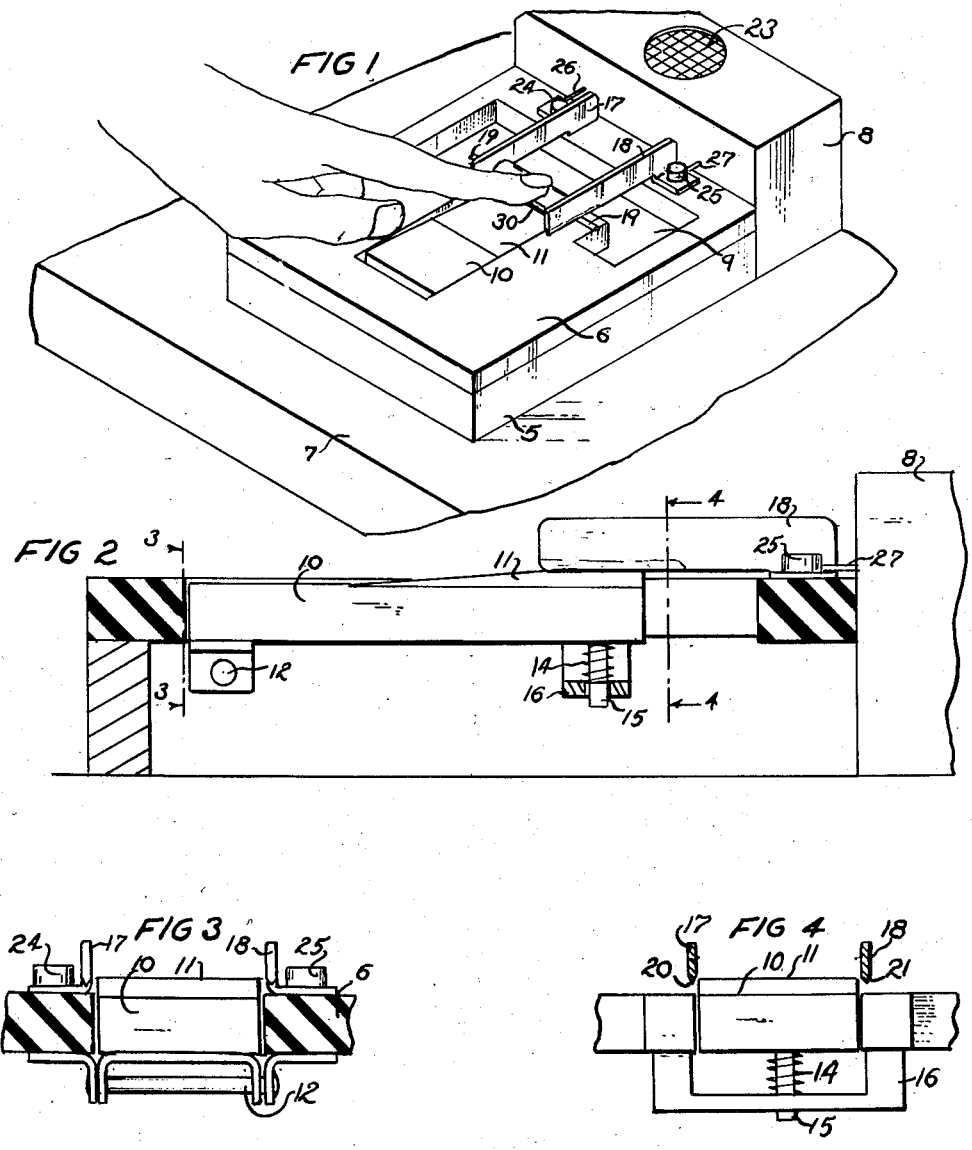
INVENTOR
D. R. DENAULT
G. MINCHENKO
By
W. C. Pannell
ATTORNEY

United States Patent Office 2,867,771
Patented Jan. 6, 1959

2,867,771

ELECTRICAL TESTING FIXTURE

Donald R. Denault, Andover, Mass., and George Minchenko, Salem-Depot, N. H., assignors to Western Electric Company, Incorporated, New York, N. Y., a corporation of New York Application November 12, 1954, Serial No. 468,441

2 Claims. (Cl. 324—158)

This invention relates to test fixtures and particularly to fixtures for testing electrical units such as capacitors or resistors having lead wires extending from opposite ends thereof.

In the mass production of electrical units having lead wires extending from opposite ends thereof, considerable time is consumed in making the electrical tests on each of the units, most of the time being required for connecting the units in the test circuit and for placing the tested units in their proper receptacles. Speed up attempts have generally resulted in increased testing errors due primarily to faulty connections between the units and the test circuit or to failure to hold the unit in the circuit long enough to permit the test equipment to operate.

The principal object of this invention, therefore, is a test fixture which will reduce the testing time for each unit and which will substantially eliminate the above mentioned sources of error in testing.

In an electrical test fixture constructed in accordance with the general features of the invention a pair of fixed electrodes, connected to conventional testing apparatus having either a visible or audible "acceptable" indicator, are disposed on opposite sides of an insulating, resiliently mounted platform along which the operator advances units to be tested. Units to be tested are pushed along the platform, the platform being depressed to permit the wire leads to slide under knife edges of the test electrodes, the resiliently mounted platform exerting an upward force to hold the unit in contact with the edges. The sliding engagement of the leads on the knife edges serves to wipe or clean off oxides or other foreign matter thereon to provide good electrical connections. These edges, however, should be sufficiently blunted to give a rubbing rather than a cutting action since nicks in the leads would cause them to break off. As the leads are moved along the contact edges the test is made and if the signal is sounded, the unit is pushed off the end of the platform where it drops into a receptacle. If the signal is not sounded, the operator withdraws and discards the unit before it reaches the end of the platform. The knife edges are made long enough to insure a sufficiently long connection of the unit in the test circuit to enable the test set to operate.

These and other features of the invention will be more fully understood from the following detailed description taken in conjunction with the accompanying drawing, in which:

Fig. 1 is an isometric view of the fixture according to the invention showing a unit being tested therein;

Fig. 2 is a side elevational view partially in section of the device of Fig. 1;

Fig. 3 is a view of the fixture as seen along the plane of line 3—3 of Fig. 2, and Fig. 4 is a view of the fixture as seen along the plane of line 4—4 of Fig. 2.

Referring now to the drawing, a main base plate 6 of insulating material such as phenol fibre has a movable test unit platform 10, also with an insulating material top portion 11, pivotally mounted in an aperture in the base by hinge 12 located on the bottom side of the base. The other end of the platform is resiliently supported on a U-shaped bracket on the bottom side of the base by a spring 14 mounted on a pin 15 in the platform 10. The spring normally holds the platform as seen in Fig. 2 so that the top surface of the insulating top portion 11 extends above the top surface of the base 6. The base plate 6 of the test fixture is mounted on a U-shaped support member 5 which may be fixed to a bench or table 7 in convenient location with respect to a test set 8 which performs the electrical tests on the units.

Lead wire contacting electrodes 17 and 18 are mounted along an edge of the base 6 and extend over an aperture 9 which opens into a receptacle under the table 7 for receiving acceptable units, that is, those which have met the requirements of the test. The ends of the electrodes extend along the sides of the spring supported end of the platform and are rounded to facilitate guiding the leads 19 of the units between the lower edge of the electrodes and the base 6. The lower or lead contacting edges 20 and 21 of the electrodes 17 and 18 respectively, may be tapered as shown so that they may rub through any foreign matter or oxides on the surface of the leads thereby insuring a good solid electrical connection therewith. The contacting portions 20 and 21 are made sufficiently long to insure keeping the unit connected to the test set for adequate time to complete the test.

To test a unit such as a molded mica capacitor 30 in the fixture, utilizing the test set 8 connected to the electrodes 17 and 18 by means of wires 26 and 27 attached to the electrode terminals 24 and 25 respectively, the unit is pushed along the platform 10 by hand, depressing the platform with a slight downward pressure of the hand until the lead wires 19 of the unit are guided under the electrodes when the downward pressure is released and the unit is simply pushed along under the electrodes until a "good" signal is emitted by the test set. The operator then merely continues to push the unit until it drops off the end of the platform into the receptacle beneath the aperture 9. If the good signal is not emitted by the test set, the defective unit is simply withdrawn from the fixture before it reaches the end of the platform and is discarded.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a fixture for testing electrical units having bodies with lead wires extending from opposite sides thereof, a base having a flat top portion, a pair of spaced rigid electrodes affixed to the base for making electrical connection to a testing circuit, mutually parallel lead wire contacting portions on the electrodes spaced from and extending substantially parallel to the plane of the flat portion with the space between said contacting portions and the base for receiving the lead wires of a unit to be tested, a depressible platform mounted to the base between the contacting portions of the electrodes for receiving bodies of units to be tested for advancement therealong with the lead wires positioned in the space between the base and the contacting portions, and resilient means for elevating the platform to urge the lead wires into rubbing contact with said contacting electrode portions to insure connecting the unit into the testing circuit when the body of a unit is advanced over the platform.

2. In a fixture for testing electrical units having bodies with lead wires extending from opposite sides thereof, a base having a flat top portion with an aperture therein through which tested units may be dropped, a test platform having one end pivotally connected to the base for receiving units to be tested thereon, the end opposite the pivot being adjacent the aperture, a pair of spaced rigid electrodes affixed to the base for making electrical connection to a testing circuit, mutually parallel lead wire contacting portions on the electrodes spaced from and extending substantially parallel to one another and parallel to the plane of the flat portion positioned along opposite sides of the platform with the space between said contacting portions and the base for receiving the lead wires of a unit to be tested, and spring biasing means for urging the lead wires of units into rubbing pressure engagement with the lead contacting portions as they are advanced along the platform to the aperture.

References Cited in the file of this patent
UNITED STATES PATENTS

| | | |
|---|---|---|
| 2,155,778 | Stratton | Apr. 25, 1939 |
| 2,704,601 | Vennes | Mar. 22, 1955 |
| 2,736,862 | Tooker | Feb. 28, 1956 |